United States Patent [19]

Peterson et al.

[11] 4,139,856
[45] Feb. 13, 1979

[54] ELECTROSTATIC RECORDER HAVING A FIXED HEAD MADE UP OF A LAMINATED STACK OF RECORDING STYLI

[75] Inventors: Dean M. Peterson, Littleton; Paul A. Diddens, Denver, both of Colo.

[73] Assignee: Honeywell Inc., Minneapolis, Minn.

[21] Appl. No.: 783,547

[22] Filed: Apr. 1, 1977

Related U.S. Application Data

[63] Continuation-in-part of Ser. No. 611,665, Sep. 9, 1975, abandoned.

[51] Int. Cl.² .................. G03G 15/06; G03G 17/02; G03G 21/00
[52] U.S. Cl. ............................ 346/163; 346/139 C; 346/165
[58] Field of Search ............... 246/162, 163, 164, 165, 246/155, 153, 139 C; 360/137, 90, 110, 126

[56] References Cited
U.S. PATENT DOCUMENTS

| | | | |
|---|---|---|---|
| 2,860,180 | 11/1958 | McConnell | 346/165 |
| 2,910,339 | 10/1959 | Eisler | 346/165 |
| 2,959,636 | 11/1960 | Lemelson | 360/90 |
| 3,063,050 | 11/1962 | Millis | 346/165 |
| 3,267,485 | 8/1966 | Howell | 346/155 |
| 3,381,300 | 4/1968 | Degonde | 346/35 |
| 3,470,563 | 9/1969 | Starr | 346/155 |
| 3,903,594 | 9/1975 | Koneval | 29/603 |
| 4,052,174 | 10/1977 | Peterson | 346/165 |

*Primary Examiner*—Jay P. Lucas
*Attorney, Agent, or Firm*—Laurence J. Marhoefer; Lockwood D. Burton

[57] ABSTRACT

An improved recorder for recording substantially simultaneously across the width of a relatively wide sheet of electrosensitive material has a fixed head made up of a laminar stack of recording styli or, as referred to herein, recording pins. Adjacent pins are offset from one another a distance sufficient to allow the passage of a purging fluid therethrough. The purging fluid conveniently may be supplied from a source of low pressure air.

18 Claims, 14 Drawing Figures

ELECTROSTATIC RECORDER HAVING A FIXED HEAD MADE UP OF A LAMINATED STACK OF RECORDING STYLI

This is a continuation-in-part of application Ser. No. 611,665 filed Sept. 9, 1975 now abandoned.

CROSS-REFERENCE TO COPENDING APPLICATIONS

Subject matter shown but not claimed herein is shown and claimed in U.S. application Ser. No. 600,058 filed July 29, 1975 and in U.S. application Ser. No. 654,565 filed Feb. 2, 1976 both applications being assigned to the same assignee as the present application.

BACKGROUND OF THE INVENTION

1. Field of the Invention

This invention relates to an improved apparatus for recording across the width of a relatively wide strip of electro-sensitive paper or other similar web material having a conductive coating thereon; and, more particularly, to a novel recorder which has a stationary, multiple-pin electric discharge recording head.

2. Description of the Prior Art

Electro-sensitive recorders are well known in the art. In one prior art electro-sensitive recorder of the class to which this invention particularly applies, a paper having a thin conductive coating (aluminum, for example) on one of its surfaces is driven past a recording head which contacts the coating. The prior art recording head comprises one or more discrete pins which are configured so that each pin makes point contact with the conductive coating on the paper. The conductive coating on the paper is electrically connected to one terminal of a potential source and when the other terminal is momentarily connected to a particular pin, a voltage gradient produced at the point where the pin contacts the coating removes a small region of the conducting coating exposing a dark undercoating and, thusly, records a mark.

Multistylus structures are used in the prior art for the print head, e.g., a plurality of separate print wires embedded in a monolithic support such as those shown in U.S. Pat. Nos. 3,381,300; 3,521,293; a plurality of electrodes formed on a printed circuit board such as those shown in U.S. Pat. Nos. 3,267,485; 3,470,563; 3,618,115; 3,618,118; 3,381,300; 3,521,293; 3,702,001; 3,733,613; 3,702,001; and 3,733,613. These prior art print heads are used in various non-impact electrographic printing operations such as electrostatic, electrolytic, spark recording, etc. One usual method of construction of the prior art multistylus head array for such electrographic recording involves the accurate placement of a plurality of small diameter wires in a technique requiring elaborate fixtures and other locating devices to provide adequate final construction tolerances.

In prior art electro-sensitive recorders, the pin or pins tend to become fouled with a residue produced by the recording process. Pin fouling is not a particularly severe problem in recorders in which the head moves in order to record across the entire width of the paper as the motion of the head tends to mechanically clean it. However, fouling is a severe problem if the head is stationary. The problem is particularly severe with a stationary head having a large number of pins.

SUMMARY OF THE INVENTION

One object of this invention is the provision of a fixed head, electro-sensitive recorder capable of printing across the entire width of a relatively wide paper web as the web moves past the head. The novel recorder we have provided meets this objective and can rapidly record information across the entire width of the paper; yet, it has a relatively low manufacturing cost as compared with prior art recorders of comparable capability. Included among the objects of the invention is the provision of: (1) a solution to the fouling problems of fixed head electro-sensitive recorders; (2) a head comprised of a large number of accruately positioned pins which wear uniformly; and (3) a good ground across the entire conductive web.

Briefly, this invention contemplates the provision of an electro-sensitive recorder in which a large plurality (on the order of 400, for example) of recording pins are disposed in a side-by-side relationship with the tip of each pin in the region where it interfaces with paper offset from its neighbors so as to allow the passage of a purging air flow through the head in the region where the head interfaces with the paper. A fluid pressure differential across the pins is maintained in this region where the head contacts the paper in order to circulate fluid (e.g., air) around the pins and remove the fouling products formed when the conductive coat is removed while these products are in a vapor or gaseous state.

DETAILED DESCRIPTION OF THE DRAWINGS

A better understanding of the present invention may be had from the following detailed description when read in connection with the accompanying drawings wherein.

DETAILED DESCRIPTION

Figure 1:
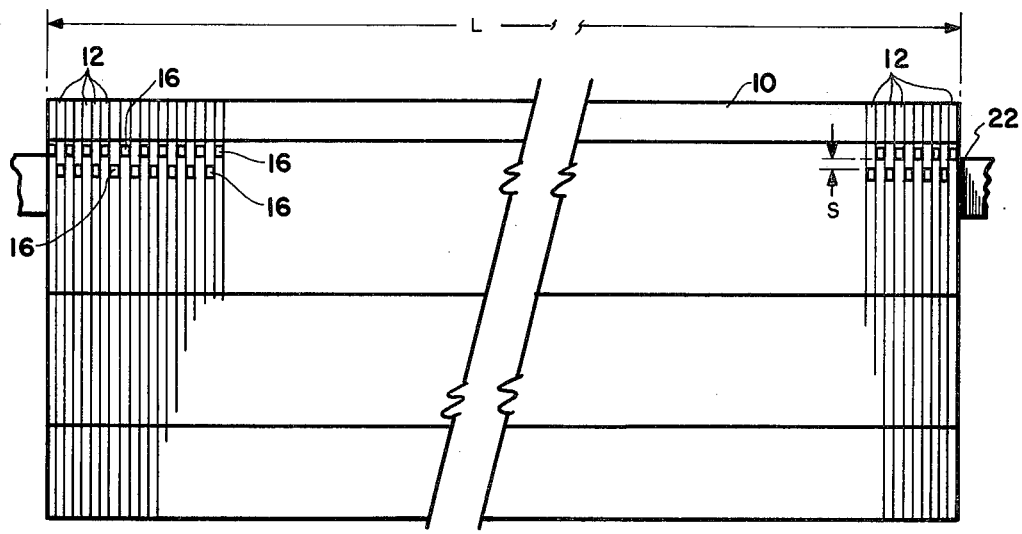
FIG. 1 is a view of one embodiment of a head assembled in accordance with the teachings of this invention. This view shows the head as it would appear looking upwardly from the web.

Referring now to FIG. 1 of the drawings, a print head 10 for the novel electro-sensitive recorder of this invention is comprised of a large number of pins 12 mounted on a rectangular bar 22 to form a unitary assembly. Each pin 12 has a tip 16, the end of which contacts the electro-sensitive paper or other electro-sensitive web material. It will be appreciated that in a typical electro-sensitive recorder of the type contemplated by this invention, the web upon which information is recorded may comprise an aluminum coating covering a layer of carbon suspended in a nitric cellulose medium all of which is carried on a paper substrate. When a pin 12 is energized in a suitable manner, well known to those skilled in the art, the relatively high current density concentrated at the point where the tip 16 contacts the aluminum coating removes the aluminum coating in the region exposing the carbon layer and, thusly, recording a mark.

The tip 16 of adjacent pins in the assembled head are offset from one another by a distance denominated as s in FIG. 1. The gaps between adjacent tips which result from these relative offsets permit air, or other purging fluid, to flow among the pins in the area where the tips interface with the paper. An important insight of this invention is that a fouling debris which tends to collect on the pins' tips is not the result of an accumulation of solid particles formed when the electrical energy cuts away the conductive coating of the paper. Rather, this fouling coating is the result of a condensation of a contaminant originally in a vapor form created when the electrical energy cuts away the conductive layer. By removing this potential conteminant while it is in the vapor phase, the pins, and particularly their tips, remain relatively uncontaminated, thus making practical a fixed head electro-sensitive recorder capable of recording across a relatively wide web. It will be appreciated that the motion of the paper relative to the staggered pin tips also assists in removing the vapor. Further, it will be appreciated that adjacent staggered pins can be energized successively in a timed relationship to the paper motion in order to record marks that are aligned.

By way of illustration, and not by way of limitation, a typical head for an electro-sensitive recorder of the type contemplated by this invention, may have a head length L on the order of 200 millimeters. Such a head would have on the order of 400 pins in order to record lines, curves, and alpha-numeric characters having a substantially continuous appearance despite the fact that the line, curve, or alphanumeric character actually is comprised of a series of small dots formed when the pin is energized for a brief instant in order to remove a small discrete region of the conductive coating and, thus, record a small dot. It should be further noted that the pins 12 must be accurately positioned over the entire length of the assembly; for example, the total error in the position of any pin should be kept to the order of plus or minus 1% irrespective of the position of that pin in the assembly.

Figures 2A, 2B, 4:
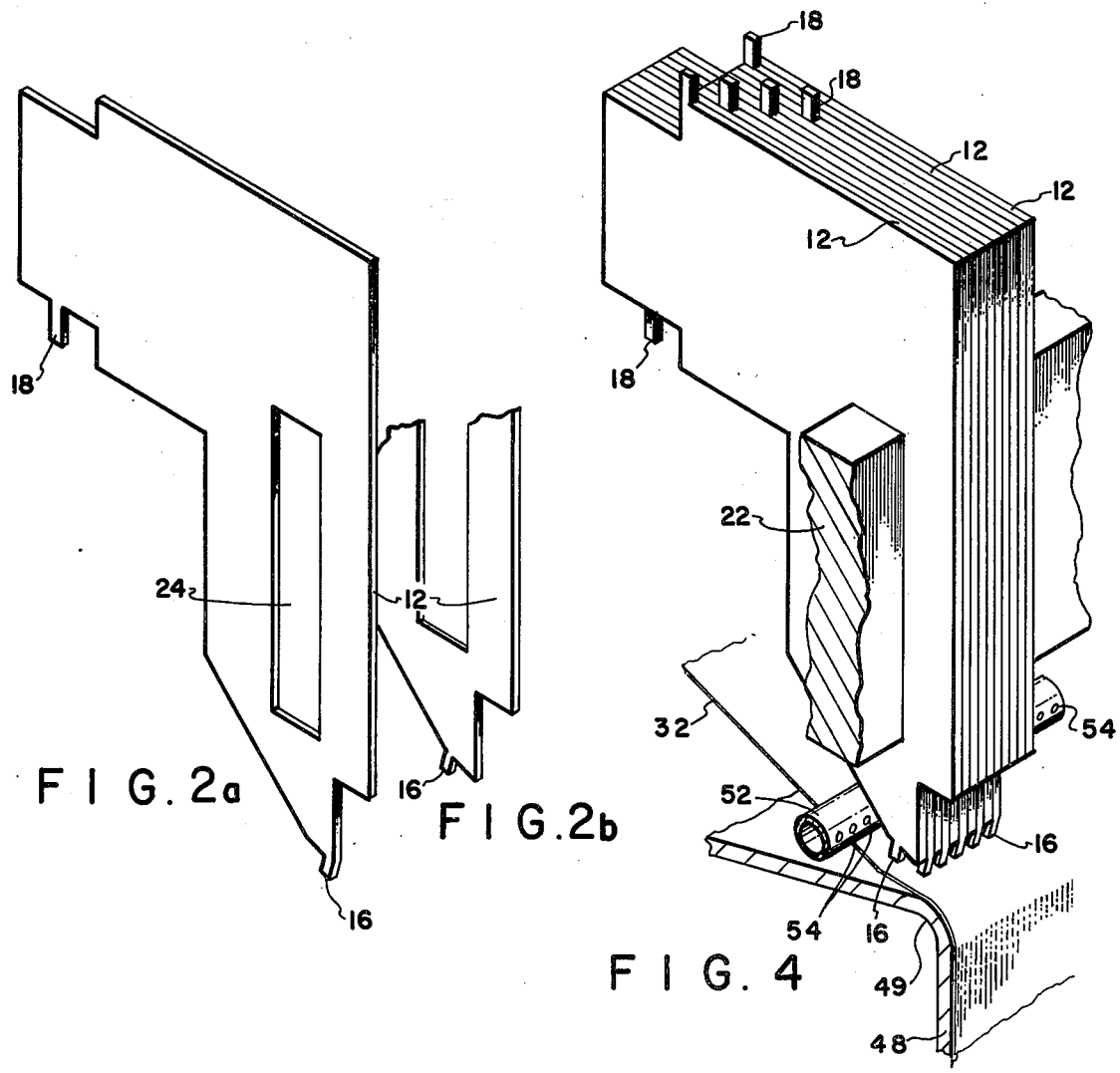
FIGS. 2A and 2B are perspective views, respectively, of a single pin of a type which may be used in assembling a head, such as the head shown in FIG. 1.
FIG. 4 is a perspective view showing details of the recorder shown in FIG. 3.

Referring now to FIGS. 2A and 2B, each of the pins 12 is substantially identical except for the relative location of the tip 16 whose tip contacts the coated surface of the paper. The tip 16 of one pin (FIG. 2A) is at the front edge of the lower extreme portion of the pin and the tip 16 of the adjacent pin (FIG. 2B) is positioned rearwardly of the tip 16 of FIG. 2A. Thus, when the pins 12 are assembled on a bar 22 which passes through a slot 24 in each of the pins, adjacent pins 16 are offset with respect to one another. Each pin 12 has a tab 18 to which an electrical combination may be made.

Figure 3:
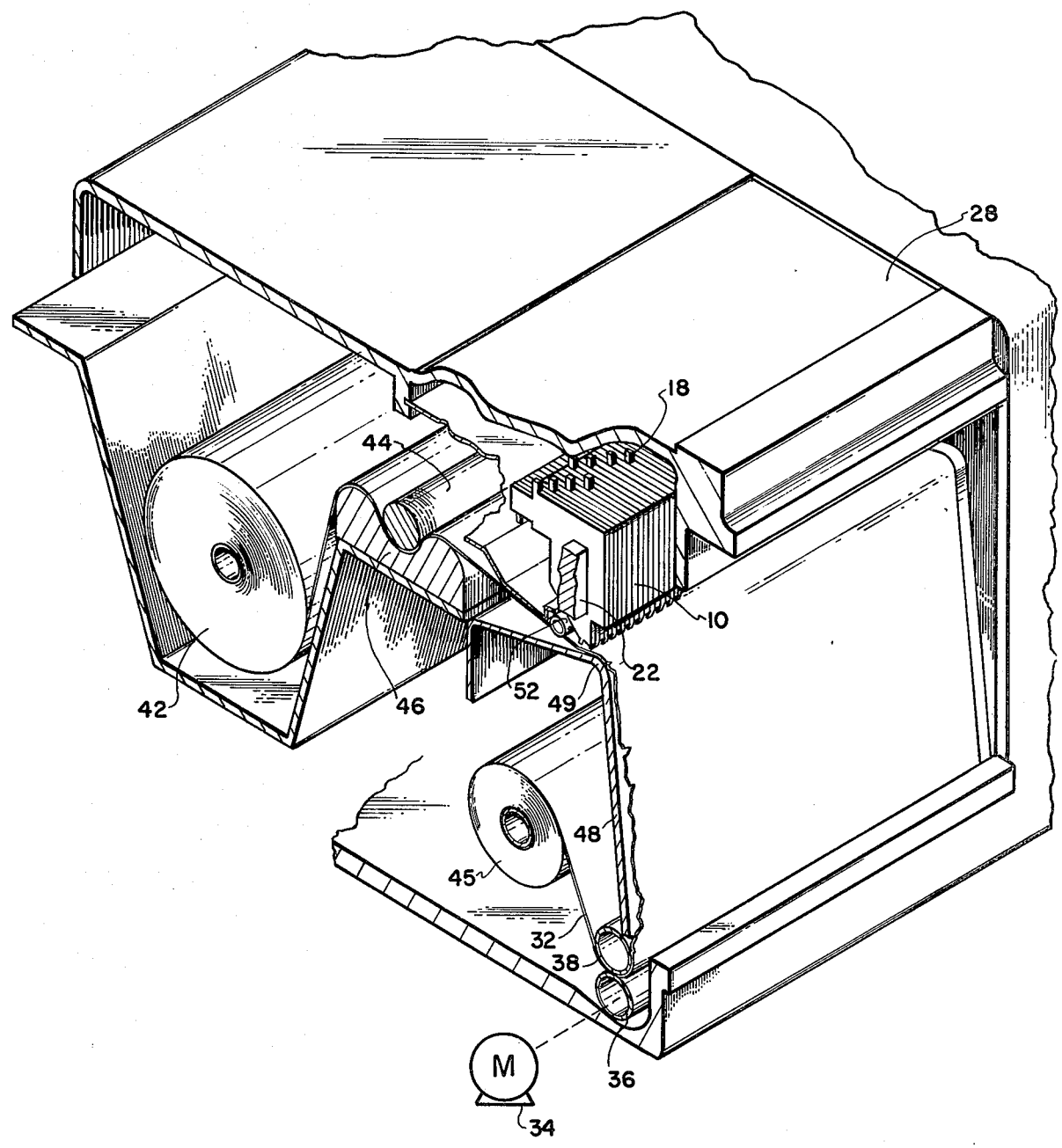
FIG. 3 is a perspective view of one embodiment of the mechanical components of an electro-sensitive recorder construction in accordance with the teachings of this invention.

Referring now to FIG. 3, the head 10 is affixed to and carried by a top cover 28 of the electro-sensitive recorder. The cover 28 conveniently may be attached to a main chassis assembly by means of a hinge (not shown) so that the recording head may be lifted out of, or rotated into, contact with an electro-sensitive web 32 after it has been threaded into place in the recorder. A pin driver printed circuit board (not shown), also carried by the cover 28, is connected to the terminals 18 of the pins in a suitable manner well known to those skilled in the art. This printed circuit board and additional electrical circuits including digital logic circuits and power supplies energize the pins in accordance with an information input signal in a manner well known to those skilled in the art.

To advance the web 32 past the print head a motor 34 (shown schematically in FIG. 3) drives a roller 36 which presses against a roller 38 and pulls the paper web 32 past the head 10. The web 32 is fed from a supply roll 42 onto a motor driven take-up roll 45. Alternatively, the web 32 may be threaded so that it is fed out from the front of the machine.

As explained in a co-pending application Ser. No. 600,058 filed July 29, 1975 and assigned to the same assignee of this case, a ground roller 44 which fits in a generally V or U-shaped drag block 46 serves both to provide an electrical return path to complete the electric circuit between an energized pin 12 through the conductive surface of the paper 32 and also to tension the paper web 32. As described more fully in the aforementioned co-pending application Ser. No. 600,058, the contact pressure between the tips of the pins 16 and the surface of the paper can be adjusted by adjusting the tension in the paper. To this end, as illustrated in FIG. 2A, the ground roller 44 is spring loaded at its bearings. This spring loading maybe adjusted by selecting a suitable spring to provide a suitable frictional force between the paper, block and roller to the end that a desired contact pressure exists between the head pin tips and the web 32. Typically, the pressure between a pin tip 16 and the web is on the order of 150–200 pounds per square inch; the tension in the paper maybe on the order of eight pounds. Varying the force with which the ground roller engages the block varies the tension of the paper web 32 and, thus, the contact pressure between the paper and the head 10. In addition, it should be noted that the drag block 46 serves to increase the angle of wrap of the web 32 around the grounding roller 44 thereby providing a good ground connection between the roller and the surface of the web. Finally, it should be noted that the contour of the paper web 32 around the head 10 is determined by the relative locations of the block 46, particularly the tangental point at which the web leaves the block, the point 49 on the frame 48 where the web again makes contact and the head location. Conveniently, the frame 48 pivots about the chassis in carrying the roller 38 in order to facilitate loading of the recorder.

Referring now to FIG. 4, in addition to FIG. 3, a pipe 52 provides a source of low pressure air flow to purge the vapor formed when the pins 12 are energized and their tip 16 removes the conductive coating on the web 32. In this embodiment, air or other suitable fluid emits from a series of ports 54 in the pipe 52 and this air flows through the interceses among the pins 16 carrying with it the vapor and, thus, preventing the pins 16 from becoming coated and fouled.

Figure 7:
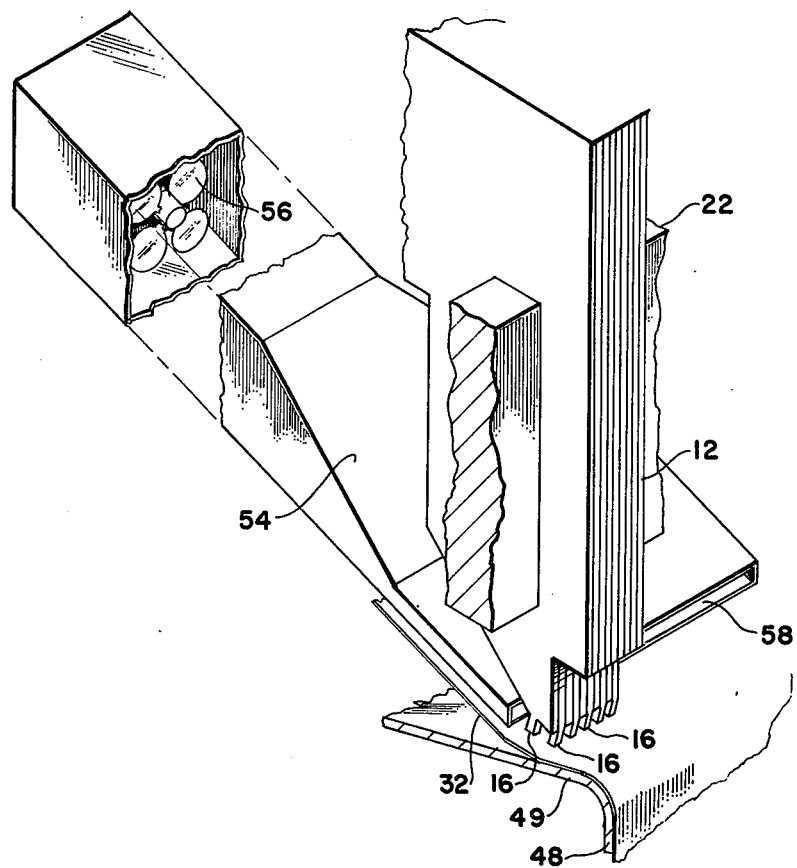
FIG. 7 is a perspective view similar to FIG. 4 showing an alternative arrangement for purging the pins.

FIG. 7 shows an alternative arrangement for providing low pressure air in the region where the pin 16 contacts the web 32. In this embodiment, a flexible conduit 54 conducts low air at low pressure generated from the exhaust of a fan 56 to the region of the pins 16 where it exits through a slot 58. The fan 56 may be used elsewhere in the recorder for cooling electrical components. As will be appreciated by those skilled in the art, this arrangement provides for certain economies of manufacture in that it does not require a separate source of low pressure air.

Purging air for the region where the pins 16 contact the web 32 and the vaporized coating forms during recording can also be supplied from a plenum within the head 10 as shown in the co-pending application Ser. No. 600,058 filed July 29, 1975 and also assigned to the same assignee as this application. In that case, the purging fluid flow is conducted to the region of the pin 16 by small channels coined in each of the pins 12. Further, it will be appreciated that the smoke and vaporized aluminum which accompanies the recording action can also be removed by creating a low pressure or vacuum source in the region of the pins in order to suck the smoke and vapor away.

Figure 5:
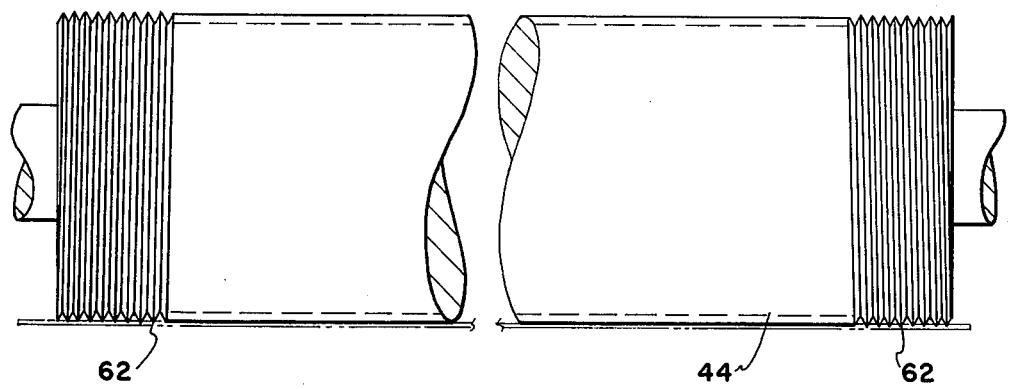
FIG. 5 is an enlarged view of a grounding roller of a type which may be used in the recorder of FIG. 3.

Referring now to FIG. 5, this figure shows a detailed view of the grounding roller 44. It will be appreciated that it is important to have good contact between the grounding roller and the surface of the paper throughout the entire width of the paper in order that the current densities at any point along the roller do not reach a sufficient level to record a mark on the web. An aluminum oxide layer tends to form on the surface of the aluminum coating which tends to insulate and thus inhibit good contact between the roller 44 and the surface of the paper. To overcome this problem, a fine thread 62 is cut into the grounding roller and this fine thread breaks through any oxide insulating coating which forms to provide good electrical contact between the grounding roller 44 and surface of the paper. It should be noted that the pitch of the thread on the left hand half of the roller should be opposite the pitch on the right hand half in order to prevent the roller from drifting the web laterally.

Figure 6:
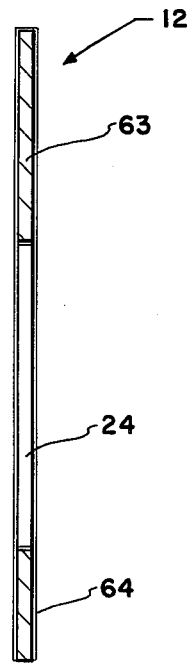
FIG. 6 is an enlarged sectional view of a pin with an insulated coating thereon.

Referring now to FIG. 6, each pin 12 has a metal substrate 63 with an insulating coating 64 to insulate each of the pins 12 electrically from its neighbor. It will be appreciated that the thickness of the pin 12 with its insulating coating 64 in place must be accurately controlled in order that the pins be accurately positioned over the entire width of the head. Conveniently, the insulating coating 64 is a Paryline coating available from Union Carbide Corporation. This coating can be applied to the metallic substrate 63 of the pin 12 by a voltage sensitive self-terminating technique known in the art which allows for extremely accurate control of the thickness of the coating. It is extremely difficult to obtain a large number of metallic substrates 63 of precisely uniform thickness. However, since the thickness of the coating 64 can be accurately controlled, the thickness of the total coated pin assembly can be controlled by varying the thickness of the coating 64 to compensate for variations in the thickness of the metal base or substrate of the pin. This can be accomplished by accurately measuring the thickness of the pin substrate which has been stamped or cut from a sheet of metal stock and then terminating the coated process when the thickness of the coating 64 is sufficiently thick to provide the desired overall thickness for the assembly.

The tips 16 of the pins 12 will wear as the recorder operates. There are two factors which cause wear; one is electrical and the other mechanical. It is advantageous that the pins be relatively long wearing; even more importantly, it is necessary that the pins wear the same over the entire length of the head 10.

In order that the pins wear evenly, in the first place, it is important that the contact pressure between each of the pins and the paper web is the same. In order to achieve equal contact pressure between offset pins, it is important that the angles of wrap of the web around respective sets of offset pins be substantially the same since, as explained more fully in connection with FIG. 8 and also more fully in the aforementioned co-pending application Ser. No. 600,058 filed July 29, 1975, these angles determine the contact pressure for a given web tension.

In addition, it should be noted that in most uses of an electro-sensitive recorder, some of the pins 12 will record relatively frequently while others will be called upon to record only occasionally. A stainless steel pin such as 310 stainless steel has good mechanical properties as regards wear. However, in operation, energization of a stainless steel pin tends to cause it to wear unevenly due to the fact that some pins are energized more frequently than others in most applications. A material having a relatively high conductivity provides relatively the same wear for the pins over the entire head length since such high conductivity pins exhibit relatively slight electrical wear. Thus, while high conductivity pins such as number 10 alloy of beryllium copper do not resist mechanical wear as well as a harder material such as a stainless steel, they wear equally since the mechanical wear on all pins is the same and the electrical wear is relatively small.

Figure 8:
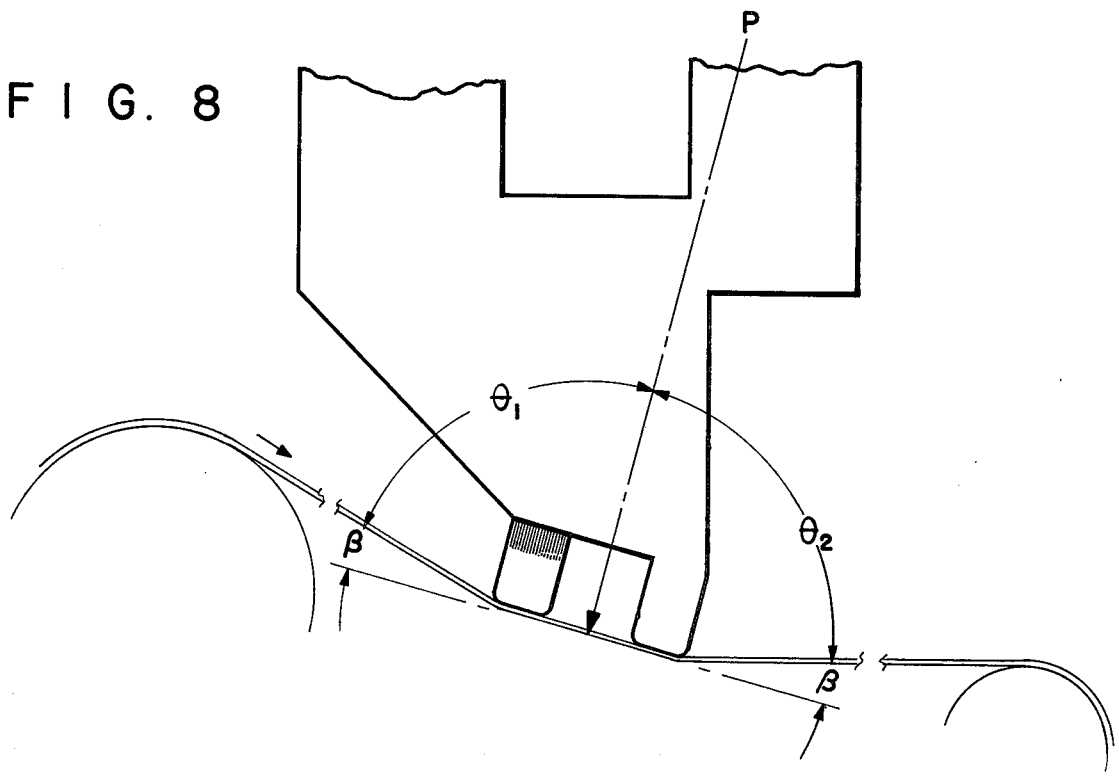
FIG. 8 is a side view of a pair of adjacent pins and illustrates a preferred geometry for the head paper interface.

Referring now to FIG. 8, the angle of wrap around each of the pins 16 is advantageously the same for all of the pins despite the fact that adjacent pins are offset from one another in order that the contact pressures on all pins are equal. As explained more fully in the aforementioned application Ser. No. 600,058, the contact pressure between the pins 16 and the web 32 can be adjusted by adjusting the tension of the web. It should further be noted that the path of the paper is determined by the relative locations of the tips 16 of the head 10, the point at which the web 32 contacts the drag block 46 on one side of the head and the point 49 where the paper contacts the frame 48 on the other side of the head.

Figure 9:
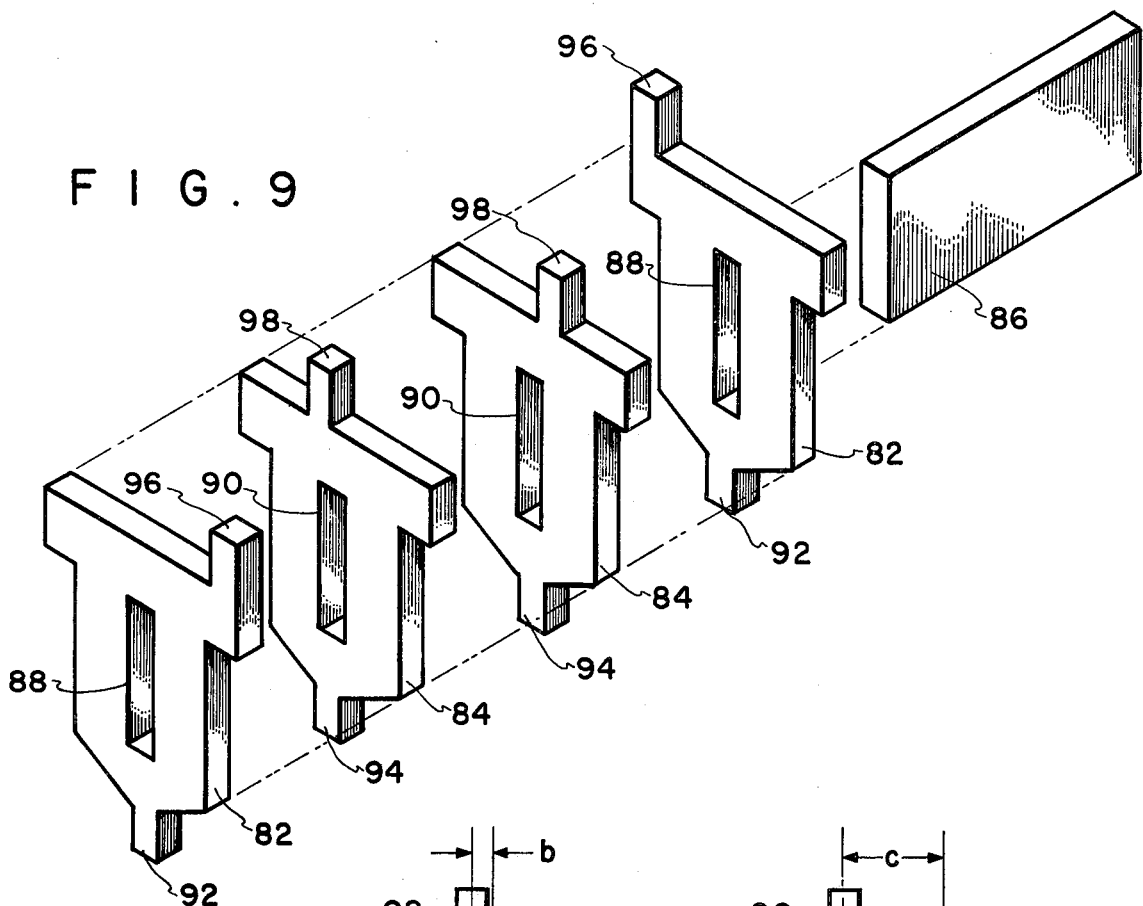
FIG. 9 is an exploded pictorial representation of an alternate print head structure embodying the present invention.

FIG. 9 shows an exploded pictorial representation of an alternate embodiment of an electrographic recording head embodying the present invention. It has a first type of electrode 82 and a second type of electrode 84 arranged in a layered stack. The first and second electrodes or pins 82 and 84 are each flat plates of an electrically conductive material, e.g., metal. A common rectangular cross-section mounting bar, or skewer 86, is arranged to pass through a closely fitting rectangular slot 88 in the first electrode 82 and a similar slot 90 in the second electrode 84. The bar 86 is electrically insulated from the electrodes. The first electrode 82 has a recording tip 92 located at one end thereof while the second electrode 84 has a similar recording pin 94 located at one end thereof. The recording tips 92 and 94 are offset, as described hereinafter, with respect to the centerline of the slots 88 and 90, respectively. Additionally, the first electrode 82 has an electrical connection terminal 96 located on the end opposite to the end having the recording pin. Similarly, the second type of electrode 84 has an electrical connection terminal 98 located on the end of the electrode opposite to the end having the recording pin. The electrical connection terminals 96 and 98 are, also, offset, as described hereinafter, with respect to the slots 88 and 90, respectively.

The electrodes 82 and 84 are electrically insulated from each other either by electrically insulating coatings deposited on the adjacent sides of the electrodes or by the use of an insulating spacer (not shown) mounted on the support bar 96 between each of the electrodes.

Figure 10:
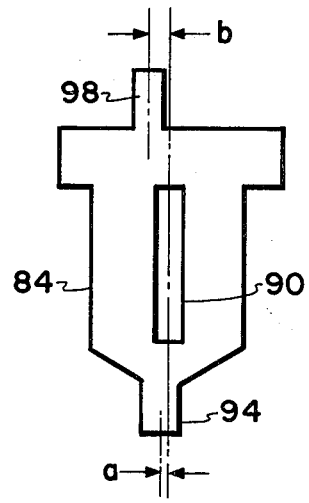
FIG. 10 is a pictorial representation of a first type of electrode used in the print head structure of FIG. 9.
Figure 11:
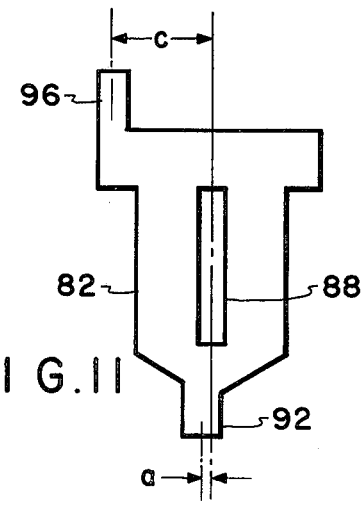
FIG. 11 is a pictorial representation of a second type of electrode used in the print head structure of FIG. 9.

In FIGS. 10 and 11, there are shown side views of the second and first type of electrodes 84, 82, respectively. As can be seen from these figures, the electrodes 82 and 84 both have their recording tips 92 and 94 offset from the centerline of the respective electrode by a distance "a." The centerline of the electrodes 82 and 84, on the other hand, may, for convenience, pass through the center of the slots. When the electrodes 82 and 84 are mounted on the support bar 86, the recording tips 92 and 94 are offset by the distance "a" from the centerline of the support bar. If the centerline of the electrodes 82 and 84 is arranged not to be the centerline of the support bar, the recording tips 92 and 94 would be offset with respect to whichever centerline is adopted as the principal reference line, e.g., the electrode centerline. The offset distance "a" can be selected to predetermine the overlap of the recording tips 92 and 94 in the recording head assembly.

The electrodes have offset electrical connection terminals 96 and 98, respectively. The terminal 96 for the first type of electrode 82 is offset by a distance "c" while the terminal 98 for the second electrode 84 is offset by a distance "b." These distances "b" and "c" can vary from that shown in FIGS. 10 and 11 to accommodate a particular wiring technique, i.e., individual wire, printed circuit boards, etc. Additionally, the first and second electrodes may actually be derived from a common multiple use electrode having both of the terminals 96 and 98 thereon. Thus, in order to obtain either of the electrodes 82 and 84, the unneeded terminal would be removed before the electrode is used in the recording head assembly.

Figure 12:
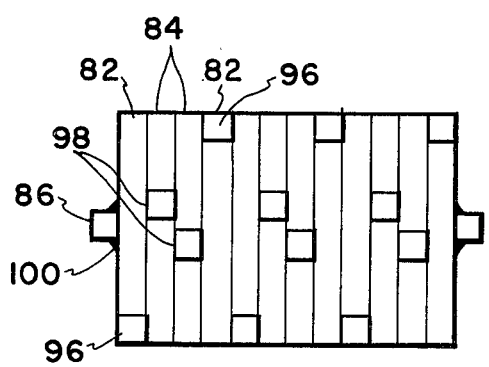
FIG. 12 is a top view of an assembled print head of the type shown in FIG. 7.
Figure 13:
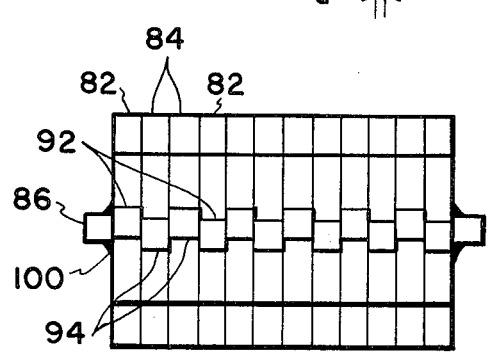
FIG. 13 is a bottom view of an assembled print head of the type shown in FIG. 7.

In FIGS. 12 and 13, there are shown top and bottom views of an assembled recording head, respectively. The electrodes 82 and 84 are intermixed in a predetermined layer pattern wherein the connection terminals 96 and 98 are separated while concurrently providing a staggered recording pin arrangement. Thus, while similar electrodes are positioned next to each other on the bar 86, they may be turned 180° along their centerlines to separate the connection terminals 96 and 98 and to stagger the recording tips 82 and 84.

The bar 86 is arranged to protrude from the ends of the assembled electrode stack and may be rigidly attached to the electrode stack by an adhesive 100 applied between the bar and the adjacent outermost faces of the electrode assembly. The assembled recording head may be mounted in a recorder by utilizing either the protruding ends of the bar, the electrical connection terminals or any other suitable mounting such as mounting spacers (not shown) inserted between preselected ones of the electrodes. Further, modifications of the recording head such as providing transverse air passages between the electrodes to admit a flow of air to the recording tips 92 and 94 for cleaning and other purposes may be used without departing from the scope of the present invention.

The embodiments of the invention in which an exclusive property or privilege is claimed are defined as follows:

1. In an improved recorder for recording on an electrosensitive web material a recording head, comprising in combination:
   an electrically insulating electrode mounting means,
   a plurality of separate electrically conductive flat plate recording electrodes mounted on said mounting means with each of said plate electrodes having a slot passing therethrough to allow said mounting means to fit in said slot to mount said electrodes in a layered arrangement on said mounting means and having a free-standing recording pin and an electrical terminal as coplaner extensions of said flat electrode; and
   electrical insulating means between each of said electrodes to electrically isolate and physically separate said electrodes.

2. An improved recorder for recording on an electrosensitive web material comprising, in combination:
   a fixed recording head;
   means for translating a web past said recording head;
   said head comprised of discrete recording pins formed into a dense laminate extending substantially the entire width of said web material, each of said pins having a tip extended from the face of the head for contacting the web material for recording thereon;
   said tips offset from one another in the direction of web translation a distance sufficient to allow a fluid flow between said tips whereby material created in recording on said web can be removed in its vapor state before it condenses on said pins.

3. An improved recorder for recording on an electrosensitive web material comprising, in combination:
   a fixed recording head;
   means for supplying a web material to said head, said supplying means including a housing for storing a roll of said web material;
   a block having a recess formed therein disposed between said storage means and said head;
   a grounding roller disposed to fit into said recess and having the web wrapped around said roller;
   means for translating said web past said recording head and said roller;
   means for supporting said web on each side of said head with said web unsupported between said support means;
   said head comprised of discrete recording pins, each of said pins having a tip for contacting the web material for recording thereon;
   said tips offset from one another in the direction of web translation a distance sufficient to allow a fluid flow between said tips;
   said support means and said offset tips disposed relative to one another that the pressure exerted on said offset tips by said web is equal; and
   means for directing a flow of purging fluid through the region where said tips contact said web in order to remove vaporized material created in the recording process before it condenses on said pins.

4. In an improved recorder for recording on an electrosensitive web material, a recording head as in claim 3 wherein said conductive flat plates are made of a soft conductive material whose wear due to the mechanical contact between said tips and said web material substantially exceeds its wear due to an electrical discharge caused by energization of said pins.

5. An improved recorder for recording on an electrosensitive web material comprising, in combination;
   a fixed recording head;
   means for translating a web past said recording head;
   said head comprised of discrete recording pins formed into a dense laminate extending substantially the entire width of said web material, each of said pins having a tip for contacting the web material for recording thereon;
   said tips offset from one another in the direction of web translation a distance sufficient to allow a fluid flow between said tips;
   a source of purging fluid disposed adjacent said head, said source directing a flow of fluid into the region where said tips contact said web whereby to remove varpoized material created in the recording process before it condenses on said pins.

6. An improved recorder for recording on an electrosensitive web material as in claim 5 wherein said recording pins each comprise a conductive flat plate mounted on an electrically insulated electrode mounting means, each of said plates having a slot passing therethrough to allow said mounting means to fit in said slot, and electrical insulating means between each of said pins to electrically isolate and physically separate said pins.

7. An improved recorder for recording on an electrosensitive web material as in claim 5 wherein said recording pins each comprise a conductive flat plate mounted on an electrically insulated electrode mounting means, each of said plates having a slot passing therethrough to allow said mounting means to fit in said slot, and electrical insulating means between each of said pins to electrically isolate and physically separate said pins, said electrical insulating means varying in thickness to compensate for variations in thickness of said conductive flat plates.

8. An improved recorder for recording on an electrosensitive web material comprising, in combination:
   a fixed recording head;
   means for supplying a web material to said head, said supplying means including a housing for storing a roll of said web material;
   a block having a recess formed therein disposed between said storage means and said head;
   a grounding roller disposed to fit into said recess and having the web wrapped around said roller;
   means for translating said web past said recording head and said roller;
   said head comprised of discrete recording pins formed into a dense laminate extending substantially the entire width of said web material, each of said pins having a tip for contacting the web material for recording thereon;
   said tips offset from one another in the direction of web translation a distance sufficient to allow a fluid flow between said tips;
   a source of purging fluid disposed adjacent said head, said source directing a flow of fluid into the region where said tips contact said web whereby to remove vaporized material created in the recording process before it condenses on said pins.

9. An improved recorder for recording on an electrosensitive web material as in claim 8 wherein said recording pins each comprise a conductive flat plate mounted on an electrically insulated electrode mounting means, each of said plates having a slot passing therethrough to allow said mounting means to fit in said slot, and electrical insulating means between each of said pins to electrically isolate and physically separate said pins.

10. An improved recorder for recording on an electrosensitive web material as in claim 8 wherein said recording pins each comprise a conductive flat plate mounted on an electrically insulated electrode mounting means, each of said plates having a slot passing therethrough to allow said mounting means to fit in said slot, and electrical insulating means between each of said pins to electrically isolate and physically separate said pins, said electrical insulating means varying in thickness to compensate for variations in thickness of said conductive flat plates.

11. An improved recorder for recording on an electrosensitive web material comprising, in combination:
    a fixed recording head;
    means for supplying a web material to said head, said supplying means including a housing for storing a roll of said web material;
    a block having a recess formed therein disposed between said storage means and said head;
    a grounding roller disposed to fit into said recess and having the web wrapped around said roller;
    means for translating said web past said recording head and said roller;
    means for supporting said web on each side of said web with said web unsupported between said support means;
    said head comprised of discrete recording pins formed into a dense laminate extending substantially the entire width of said web material, each of said pins having a tip for contacting the web material for recording thereon;
    said tips offset from one another in the direction of web translation a distance sufficient to allow a fluid flow between said tips;
    said support means and said offset tips disposed relative to one another that the pressure exerted on said offset tips by said web is equal; and
    a source of purging fluid disposed adjacent said head, said source directing a flow of fluid into the region where said tips contact said web whereby to remove vaporized material created in the recording process before it condenses on said pins.

12. An improved recorder for recording on an electrosensitive web material as in claim 11 wherein said recording pins each comprise a conductive flat plate mounted on an electrically insulated electrode mounting means, each of said plates having a slot passing therethrough to allow said mounting means to fit in said slot, and electrical insulating means between each of said pins to electrically isolate and physically separate said pins.

13. An improved recorder for recording on an electrosensitive web material as in claim 11 wherein said recording pins each comprise a conductive flat plate mounted on an electrically insulated electrode mounting means, each of said plates having a slot passing therethrough to allow said mounting means to fit in said slot, and electrical insulating means between each of said pins to electrically isolate and physically separate said pins, said electrical insulating means varying in thickness to compensate for variations in thickness of said conductive flat plates.

14. In an improved recorder for recording on an electrosensitive web material, a recording head comprising, in combination:

an electrically insulating electrode mounting means, a plurality of separate electrically conductive flat plate recording electrodes mounted on said mounting means with each of said plate electrodes having a slot passing therethrough to allow said mounting means to fit in said slot to mount said electrodes in a layered arrangement on said mounting means and having a free-standing recording pin and an electrical terminal as coplaner extensions of said flat electrode; and electrical insulating means between each of said electrodes to electrically isolate and physically separate said electrodes;

said electrical insulating means varying in thickness to compensate for variations in thickness of said conductive flat plates whereby to produce a head in which the recording pins are accurately located.

15. In an improved recorder for recording on an electrosensitive web material, a recording head as in claim 14 wherein said conductive flat plates are made of a soft conductive material whose mechanical wear substantially exceeds its electrical wear.

16. An improved recorder for recording on an electrosensitive web material comprising, in combination:

a fixed recording head;

means for translating a web past said recording head;

said head comprised of discrete recording pins, each of said pins having a tip for contacting the web material for recording thereon, said tips comprising a soft conductive material whose wear due to the mechanical contact between said tips and said web material substantially exceeds its wear due to an electrical discharge caused by energization of said pins;

said tips offset from one another in the direction of web translation a distance sufficient to allow a fluid flow between said tips; and means for directing a flow of purging fluid through the region where said tips contact said web in order to remove vaporized material created in the recording process before it condenses on said pins.

17. An improved recorder for recording on an electrosensitive web material comprising, in combination:

a fixed recording head;

means for translating a web past said recording head;

said head comprised of discrete recording pins, each of said pins having a tip for contacting the web material for recording thereon;

said tips offset from one another in the direction of web translation a distance sufficient to allow a fluid flow between said tips; and means for directing a flow of purging fluid through the region where said tips contact said web in order to remove vaporized material created in the recording process before it condenses on said pins.

18. An improved recorder for recording on an electrosensitive web material comprising, in combination:

a fixed recording head;

means for supplying a web material to said head, said supplying means including a housing for storing a roll of said web material;

a block having a recess formed therein disposed between said storage means and said head;

a grounding roller disposed to fit into said recess and with the web wrapped around said roller;

means for translating said web past said recording head and said roller;

said head comprised of discrete recording pins extending substantially the entire width of said web material, each of said pins having a tip for contacting the web material for recording thereon;

said tips offset from one another in the direction of web translation a distance sufficient to allow a fluid flow between said tips; and means for directing a flow of purging fluid through the region where said tips contact said web in order to remove vaporized material created in the recording process before it condenses on said pins.

* * * * *